US011507534B2

(12) United States Patent
Christiansen et al.

(10) Patent No.: US 11,507,534 B2
(45) Date of Patent: Nov. 22, 2022

(54) METADATA STORAGE FOR PLACEHOLDERS IN A STORAGE VIRTUALIZATION SYSTEM

(71) Applicant: Microsoft Technology Licensing, LLC, Redmond, WA (US)

(72) Inventors: Neal R. Christiansen, Bellevue, WA (US); Craig Ashley Barkhouse, Duvall, WA (US); Michael J. Novak, Redmond, WA (US); Ping Xie, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/848,519

(22) Filed: Dec. 20, 2017

(65) Prior Publication Data

US 2018/0329905 A1 Nov. 15, 2018

Related U.S. Application Data

(60) Provisional application No. 62/504,767, filed on May 11, 2017.

(51) Int. Cl.
*G06F 16/16* (2019.01)
*G06F 3/06* (2006.01)
(Continued)

(52) U.S. Cl.
CPC ............ *G06F 16/164* (2019.01); *G06F 3/067* (2013.01); *G06F 3/0665* (2013.01); *G06F 16/13* (2019.01);
(Continued)

(58) Field of Classification Search
CPC .. G06F 3/067; G06F 11/1464; G06F 16/1752; G06F 3/064; G06F 16/10;
(Continued)

(56) References Cited

U.S. PATENT DOCUMENTS 7,236,987 B1 6/2007 Faulkner et al.
7,636,818 B2 12/2009 Tamura et al.
(Continued)

FOREIGN PATENT DOCUMENTS

CN 105474206 A 4/2016

OTHER PUBLICATIONS

"Cloud Drive Virtualization Technology", In White Paper of Cameyo, May 2015, 5 Pages.
(Continued)

*Primary Examiner* — Yuk Ting Choi

(57) ABSTRACT

A file system executing on a computing device may store a placeholder for a file on secondary storage of the computing device. The placeholder may comprise a sparse data stream containing none or some of the data of the file and information which enables the remotely stored data of the file to be retrieved from the network. As some or all of the data for the file is being stored remotely, the computing device may rely on a storage virtualization provider to create metadata for the file. Thus, the file system executing on the computing device may receive, from the storage virtualization provider, a request to store metadata associated with the file. In response to this request, the file system may store the metadata as a Binary Large Object (BLOB) in a secondary data stream of the placeholder for the file.

20 Claims, 13 Drawing Sheets

(51) Int. Cl.
*G06F 16/13* (2019.01)
*G06F 16/182* (2019.01)
*G06F 16/188* (2019.01)
*H04L 67/1097* (2022.01)

(52) U.S. Cl.
CPC .......... *G06F 16/182* (2019.01); *G06F 16/188* (2019.01); *H04L 67/1097* (2013.01)

(58) Field of Classification Search
CPC ...... G06F 16/122; G06F 16/13; G06F 16/188; G06F 16/275; G06F 16/24573; G06F 17/3012; G06F 3/0665; H04L 67/1095; G06Q 10/10
See application file for complete search history.

(56) References Cited

U.S. PATENT DOCUMENTS

| | | | |
|---|---|---|---|
| 8,832,296 | B2 | 9/2014 | Yandek et al. |
| 8,856,089 | B1* | 10/2014 | Briggs ................ G06F 16/2315 707/695 |
| 9,167,313 | B1 | 10/2015 | Bacco |
| 9,239,762 | B1 | 1/2016 | Gunda et al. |
| 9,424,062 | B1 | 8/2016 | Mummidi et al. |
| 9,552,363 | B2* | 1/2017 | Novak ................ G06F 16/178 709/203 |
| 2004/0117369 | A1 | 6/2004 | Mandal et al. |
| 2004/0225719 | A1 | 11/2004 | Kisley et al. |
| 2005/0071349 | A1* | 3/2005 | Jordan ................ G06F 16/283 707/999.1 |
| 2006/0248038 | A1* | 11/2006 | Kaplan ................ G06F 16/164 707/999.001 |
| 2007/0185934 | A1* | 8/2007 | Cannon ............... G06F 11/1469 707/999.204 |
| 2010/0037089 | A1 | 2/2010 | Krishnan et al. |
| 2010/0106734 | A1* | 4/2010 | Calder .................... G06F 16/93 707/758 |
| 2011/0196833 | A1* | 8/2011 | Drobychev ........... G06F 16/248 707/634 |
| 2011/0264669 | A1 | 10/2011 | Lu et al. |
| 2013/0013561 | A1* | 1/2013 | Chan .................... G06F 16/172 707/636 |
| 2013/0159381 | A1 | 6/2013 | Morgan |
| 2013/0166855 | A1 | 6/2013 | Batwara et al. |
| 2013/0204849 | A1 | 8/2013 | Chacko |
| 2013/0226876 | A1 | 8/2013 | Gati et al. |
| 2013/0282979 | A1 | 10/2013 | Suzuki |
| 2013/0311597 | A1 | 11/2013 | Arrouye et al. |
| 2014/0006725 | A1 | 1/2014 | Shiomi |
| 2014/0040446 | A1 | 2/2014 | Cohen et al. |
| 2014/0324945 | A1* | 10/2014 | Novak ................ G06F 16/1744 709/203 |
| 2014/0330874 | A1* | 11/2014 | Novak ................ H04L 65/4069 707/827 |
| 2015/0026143 | A1 | 1/2015 | Patel et al. |
| 2015/0032690 | A1 | 1/2015 | Hoque et al. |
| 2015/0309838 | A1 | 10/2015 | Steele |
| 2016/0292178 | A1* | 10/2016 | Manville ............. G06F 16/1752 707/695 |
| 2017/0192998 | A1* | 7/2017 | Sergeev ................ G06F 16/162 707/695 |
| 2017/0286520 | A1* | 10/2017 | Christian ............ G06F 16/9024 707/827 |
| 2018/0059990 | A1 | 3/2018 | Christiansen et al. |

OTHER PUBLICATIONS

Gross, Cindy, "Understanding WASB and Hadoop Storage in Azure", Retrieved From: https://web.archive.org/web/20150713232320/https://nealanalytics.com/understanding-wasb-and-hadoop-storage-in-azure/, Feb. 5, 2015, 3 Pages.

Nicolae, et al., "BlobSeer: Next-Generation Data Management for Large Scale Infrastructures", In Journal of Parallel and Distributed Computing, vol. 71, Issue 2, Aug. 21, 2010, pp. 169-184.

"International Search Report and Written Opinion Issued in PCT Application No. PCT/US2017/047710", dated Oct. 4, 2017, 13 Pages.

"International Search Report and Written Opinion Issued in PCT Application No. PCT/US2018/028768", dated Jul. 17, 2018, 13 Pages.

Wu, et al., "Big Data Storage and Data Models", In Handbook of Big Data Technologies, Feb. 26, 2017, 28 Pages.

Warren, Tom, "Dropbox's new magical placeholders save you hard drive space", https://www.theverge.com/2016/4/26/11508486/dropbox-placeholders-project-infinite, Published on: Apr. 26, 2016, 3 pages.

Vishav, Pradeep, "Smart Sync brings placeholder files to Dropbox", https://mspoweruser.com/smart-sync-brings-placeholder-files-to-dropbox/, Published on: Jan. 30, 2017, 19 pages.

Hassan, Mehedi, "OneDrive Placeholders are coming back, now called On-Demand Sync", https://mspoweruser.com/onedrive-placeholders-coming-back-now-called-demand-sync/, Published on: Sep. 26, 2016, 24 pages.

"Quickstart for Cloud Files", https://developer.rackspace.com/docs/cloud-files/quickstart/, Retrieved on: May 10, 2017, 3 pages.

"Non Final Office Action Issued in U.S. Appl. No. 15/493,403", dated Nov. 20, 2018, 23 Pages.

"Final Office Action Issued in U.S. Appl. No. 15/493,403", dated Jun. 12, 2019, 27 Pages.

"Non Final Office Action Issued in U.S. Appl. No. 15/493,403", dated Nov. 21, 2019, 29 Pages.

"Using Azure Storage API in an Asp.Net MVC Application", Retrieved From: https://www.dotnetcurry.com/windows-azure/1099/azure-storage-api-aspnet-mvc, Mar. 10, 2015, 11 Pages.

"Office Action Issued in European Patent Application No. 18723255.8", dated Aug. 27, 2021, 8 Pages.

"Office Action Issued in Indian Patent Application No. 201947041604", dated Feb. 8, 2022, 7 Pages.

"Office Action Issued in European Patent Application No. 18723255.8", dated May 13, 2022, 8 Pages.

Pistelli, Daniel, "The .NET File Format—CodeProject", Retrieved from: https://www.codeproject.com/Articles/12585/The-NET-File-Format, Jun. 24, 2008, 34 Pages.

"Office Action and Search Report Issued in China Patent Application No. 201780051402.6", dated Sep. 1, 2022, 23 Pages.

* cited by examiner

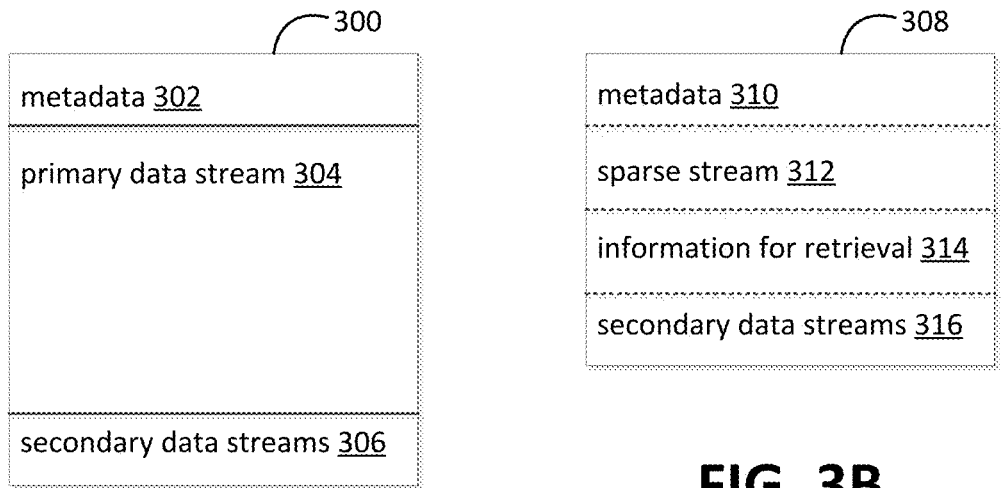
FIG. 3A
FIG. 3B
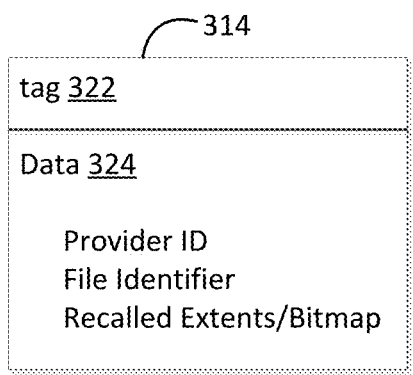
FIG. 3C

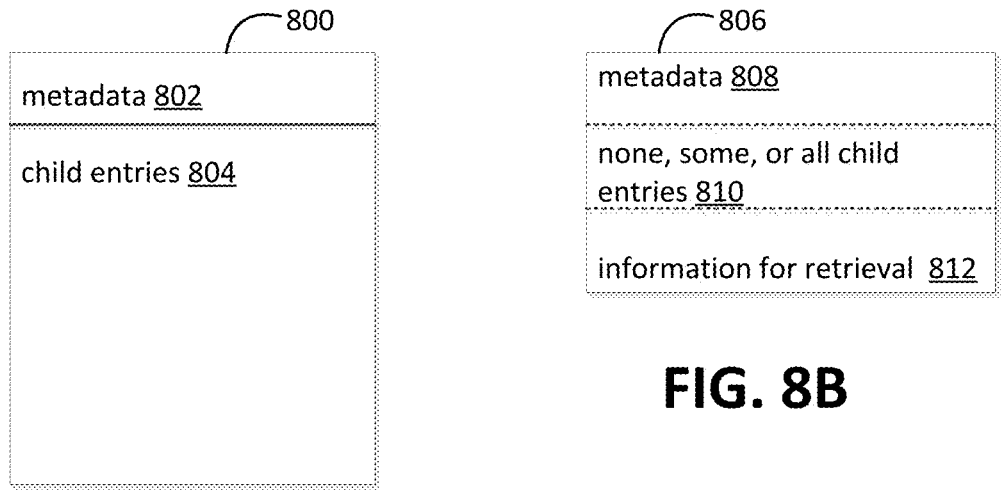
FIG. 8B
FIG. 8A
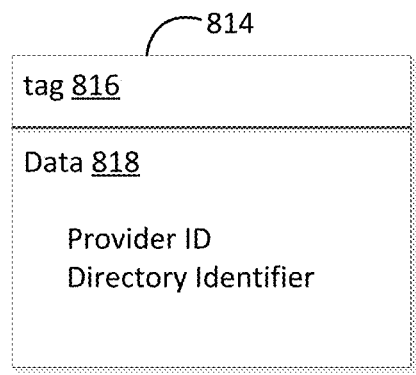
FIG. 8C

METADATA STORAGE FOR PLACEHOLDERS IN A STORAGE VIRTUALIZATION SYSTEM

CROSS-REFERENCE TO RELATED APPLICATIONS

This application is based on earlier filed U.S. Provisional Patent Application No. 62/504,767 filed on May 11, 2017, titled "Metadata Storage For Placeholders In A Storage Virtualization System," the content of which is hereby incorporated by reference in its entirety.

BACKGROUND

With the ever increasing need for data storage in computer systems, the use of cloud storage providers is increasing. With cloud storage, the data of a file or directory is stored "in the cloud" rather than on a user's local computing device. When the data for a file or directory is needed, it can be pulled "from the cloud" back onto the user's local computing device. In a typical computer system, a component located on a computing device, such as an indexer, may be configured to index properties associated with the files and to store these properties as metadata with the file. Unfortunately, the process of creating and storing metadata for files stored in the cloud is not as seamless as when those files are stored locally on the computing device.

SUMMARY

Disclosed herein are techniques that allow metadata for a file to be received from a storage virtualization provider, or any other application, module, or component desiring to store metadata for a file hosted by a storage virtualization provider, and to have that metadata be stored within a placeholder for the file on the secondary storage of the local computing device. For example, in a storage virtualization system, the data of a file may be stored remotely, such as on a network (i.e., in the cloud), and access to the data of the file by applications, modules, or components of a local computing device may be handled by a storage virtualization provider executing on the local computing device that is configured to retrieve the remotely stored data of the file as needed. In such a system, a storage virtualization filter of the file system of the computing device may store a placeholder for the file on secondary storage of the computing device. The placeholder for the file may comprise a sparse data stream containing none or some of the data of the file and information which enables the remotely stored data of the file to be retrieved from the network, as needed. Although the placeholder may not actually hold any of the data of the file, the placeholder may appear to applications running on the computing device as if the complete file was stored on the secondary storage. But because some or all of the data for the file is stored remotely and is not present on the local computing device, certain applications or components on the local computing device that might otherwise generate metadata for the file—such as an indexer—cannot do so because not all of the data of the file resides on the local computing device. In the case of certain metadata, for example, the file system may need to rely on the storage virtualization provider to generate metadata associated with the file, since the storage virtualization provider manages the full file (i.e., all of its data) on remote storage. Disclosed herein are methods and apparatus that enable applications or other entities on a local computing device, such as a storage virtualization provider, to request that metadata for a remotely stored file be stored in association with the file on the local computing device. According to the methods and apparatus disclosed herein, in one embodiment, when such a request is received, a storage virtualization filter of the file system on the local computing device stores the metadata within the placeholder for the file on the secondary storage of the computing device. In one embodiment, the file system may store the metadata as a Binary Large Object (BLOB) in a secondary data stream of the placeholder for the file.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. In the drawings:

FIG. 3A illustrates a regular file, in accordance with one embodiment;

FIG. 3B illustrates a placeholder for a file, in accordance with one embodiment;

FIG. 3C illustrates a reparse point for a placeholder for a file;

FIG. 8A illustrates a regular directory, in accordance with one embodiment;

FIG. 8B illustrates a placeholder for a directory, in accordance with one embodiment;

FIG. 8C illustrates a reparse point for a directory placeholder, in accordance with one embodiment;

DETAILED DESCRIPTION OF ILLUSTRATIVE EMBODIMENTS

Disclosed herein are techniques that allow metadata for a file to be received from a storage virtualization provider, or any other application, module, or component desiring to store metadata for a file hosted by a storage virtualization provider, and to have that metadata be stored within a placeholder for the file on the secondary storage of the local computing device. For example, a file system executing on a computing device may receive, from a storage virtualization provider or from another application, module, or component, a request to store metadata associated with the file.

And in response to this request, the file system may store the metadata as a Binary Large Object (BLOB) in a secondary data stream of the placeholder for the file.

Example Computing Device

Figure 1:
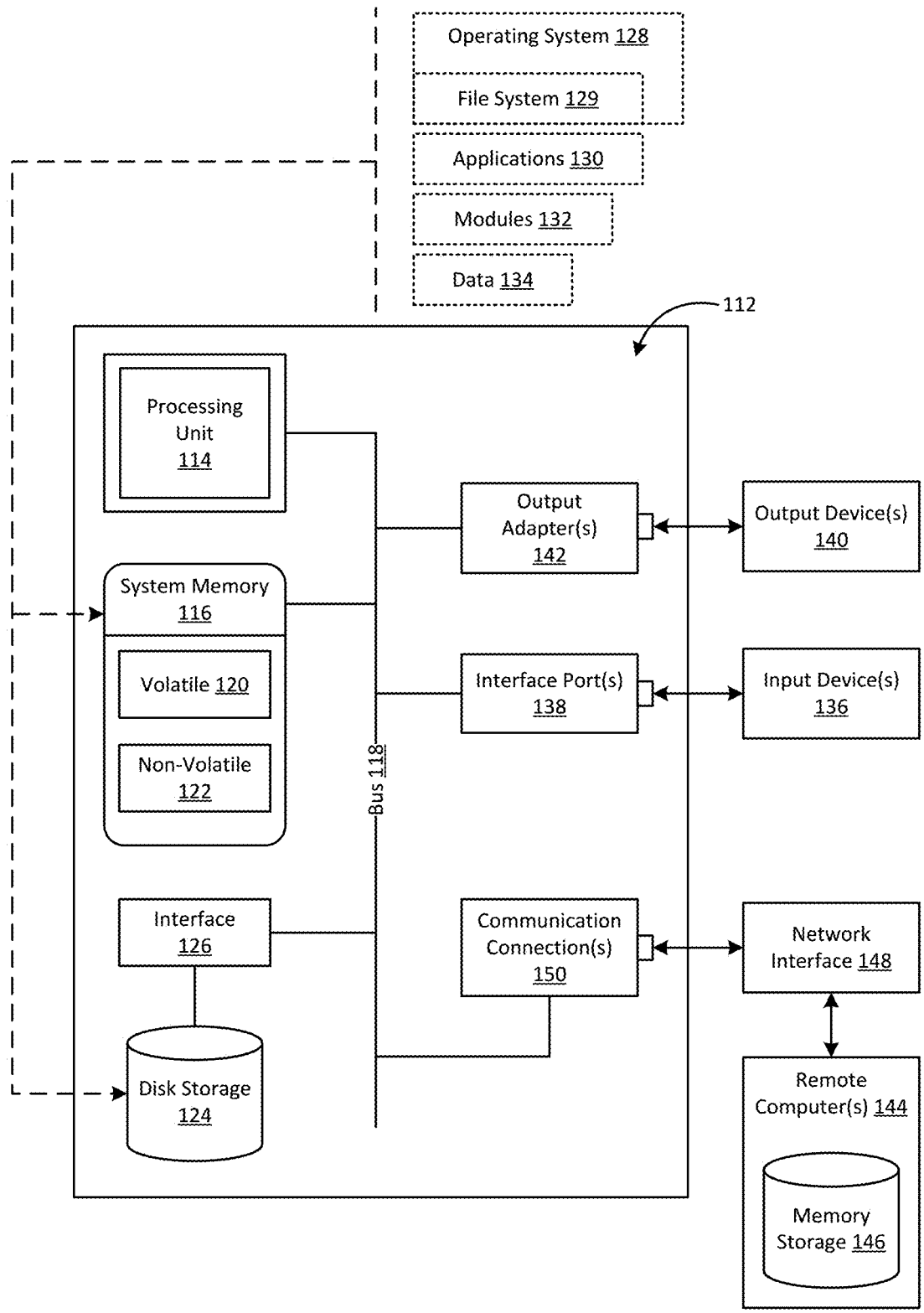
FIG. 1 illustrates an exemplary computing device, in which the aspects disclosed herein may be employed.

FIG. 1 illustrates an example computing device 112 in which the techniques and solutions disclosed herein may be implemented or embodied. The computing device 112 may be any one of a variety of different types of computing devices, including, but not limited to, a computer, personal computer, server, portable computer, mobile computer, wearable computer, laptop, tablet, personal digital assistant, smartphone, digital camera, or any other machine that performs computations automatically.

The computing device 112 includes a processing unit 114, a system memory 116, and a system bus 118. The system bus 118 couples system components including, but not limited to, the system memory 116 to the processing unit 114. The processing unit 114 may be any of various available processors. Dual microprocessors and other multiprocessor architectures also may be employed as the processing unit 114.

The system bus 118 may be any of several types of bus structure(s) including a memory bus or memory controller, a peripheral bus or external bus, and/or a local bus using any variety of available bus architectures including, but not limited to, Industry Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 116 includes volatile memory 120 and nonvolatile memory 122. The basic input/output system (BIOS), containing the basic routines to transfer information between elements within the computing device 112, such as during start-up, is stored in nonvolatile memory 122. By way of illustration, and not limitation, nonvolatile memory 122 may include read only memory (ROM), programmable ROM (PROM), electrically programmable ROM (EPROM), electrically erasable ROM (EEPROM), or flash memory. Volatile memory 120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computing device 112 also may include removable/non-removable, volatile/non-volatile computer-readable storage media, which may be referred to herein as secondary storage. FIG. 1 illustrates secondary storage, for example, in the form of a disk storage 124. Secondary storage (e.g., disk storage) 124 includes, but is not limited to, devices like a magnetic disk drive, floppy disk drive, tape drive, Jaz drive, Zip drive, LS-100 drive, memory card (such as an SD memory card), or memory stick. In addition, disk storage 124 may include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 124 to the system bus 118, a removable or non-removable interface is typically used such as interface 126. The terms disk storage and secondary storage may be used interchangeably herein.

FIG. 1 further depicts software that acts as an intermediary between users and the basic computer resources described in the computing device 112. Such software includes an operating system 128. Operating system 128, which may be stored on disk storage 124, acts to control and allocate resources of the computing device 112. Applications 130 take advantage of the management of resources by operating system 128 through program modules 132 and program data 134 stored either in system memory 116 or on disk storage 124. It is to be appreciated that the aspects described herein may be implemented with various operating systems or combinations of operating systems. As further shown, the operating system 128 includes a file system 129 for storing and organizing, on the disk storage 124, computer files and the data they contain to make it easy to find and access them.

A user may enter commands or information into the computing device 112 through input device(s) 136. Input devices 136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 114 through the system bus 118 via interface port(s) 138. Interface port(s) 138 include, for example, a serial port, a parallel port, a game port, and a universal serial bus (USB). Output device(s) 140 use some of the same type of ports as input device(s) 136. Thus, for example, a USB port may be used to provide input to computing device 112, and to output information from computing device 112 to an output device 140. Output adapter 142 is provided to illustrate that there are some output devices 140 like monitors, speakers, and printers, among other output devices 140, which require special adapters. The output adapters 142 include, by way of illustration and not limitation, video and sound cards that provide a means of connection between the output device 140 and the system bus 118. It should be noted that other devices and/or systems of devices provide both input and output capabilities such as remote computer(s) 144.

Computing device 112 may operate in a networked environment using logical connections to one or more remote computing devices, such as remote computing device(s) 144. The remote computing device(s) 144 may be a personal computer, a server, a router, a network PC, a workstation, a microprocessor based appliance, a peer device, another computing device identical to the computing device 112, or the like, and typically includes many or all of the elements described relative to computing device 112. For purposes of brevity, only a memory storage device 146 is illustrated with remote computing device(s) 144. Remote computing device (s) 144 is logically connected to computing device 112 through a network interface 148 and then physically connected via communication connection 150. Network interface 148 encompasses communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 150 refers to the hardware/software employed to connect the network interface 148 to the bus 118. While communication connection 150 is shown for illustrative clarity inside computing device 112, it may also be external to computing device 112. The hardware/software necessary for connection to the network interface 148 includes, for exemplary purposes only, internal and external technologies such as modems including regular telephone grade modems, cable modems and DSL modems, ISDN adapters, and Ethernet cards.

As used herein, the terms "component," "system," "module," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server may be a component. One or more components may reside within a process and/or thread of execution and a component may be localized on one computer and/or distributed between two or more computers.

Storage Virtualization

Figure 2:
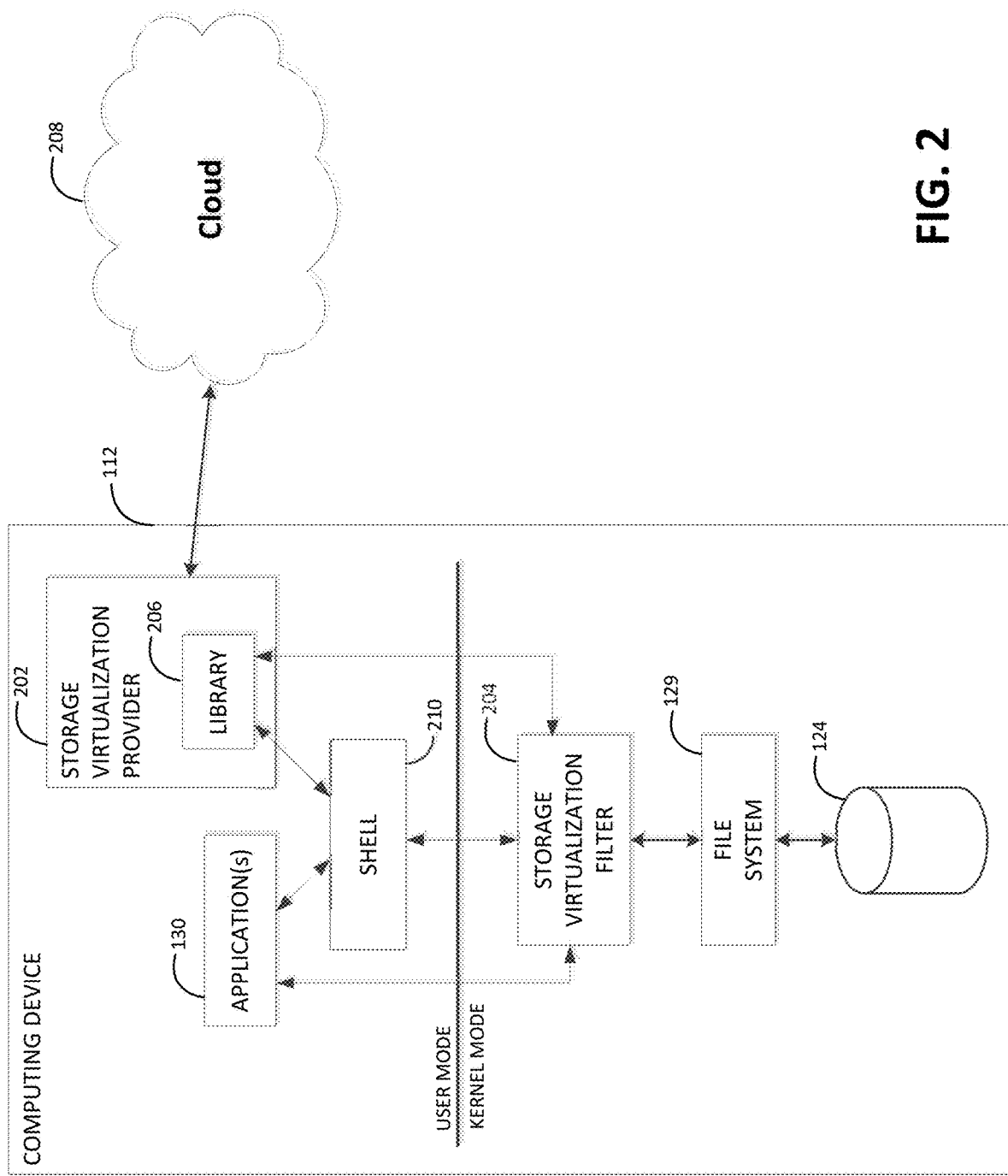
FIG. 2 illustrates an example architecture for storage virtualization in accordance with one embodiment.

In accordance with the storage virtualization techniques disclosed herein, a placeholder may be created on a local computing device for a file or directory. The placeholder appears to a user or application as a regular file or directory on the computing device. That is, an application can issue I/O calls on the file or directory as if the file or directory was stored locally, but the placeholder may not contain all the data of the file or directory. FIG. 2 is a block diagram illustrating the components of an architecture for implementing the storage virtualization techniques described herein, in accordance with one embodiment. As shown, in one embodiment, the architecture comprises: a user-mode storage virtualization provider module 202 responsible for retrieving remotely stored file and directory data from a network 208 (e.g., "from the cloud"); a file system filter 204, referred to herein as a storage virtualization filter, that creates and manages placeholders for files and directories and notifies the user-mode storage virtualization provider of access attempts to files or directories whose data is managed by the filter 204 and provider 202; a user-mode library 206 that abstracts many of the details of provider-filter communication; and a shell component 210 that serves as an interface for access to the file system 129 by an application 130 and the storage virtualization provider 202. Note that while the storage virtualization provider 202 runs in user-mode in the illustrated embodiment of FIG. 2, in other embodiments the storage virtualization provider 202 could be a kernel-mode component. The disclosed architecture is not limited to the user-mode embodiment described herein.

In the illustrated embodiment, the user-mode storage virtualization provider module 202 may be implemented (e.g., programmed) by a developer of a remote storage service or entity that provides remote storage services to computing device users. Examples of such remote storage services, sometimes also referred to as cloud storage services, include Microsoft OneDrive and similar services. Thus, there may be multiple different storage virtualization providers, each for a different remote storage service. In the illustrated embodiment, the storage virtualization provider module 202 interfaces with the storage virtualization filter 204 via application programming interfaces (APIs) defined and implemented by the user mode library 206. The storage virtualization provider module 202 implements the intelligence and functionality necessary to store and fetch file or directory data to/from a remote storage location (not shown) on the network 208.

The user-mode library 206 abstracts many of the details of communication between the storage virtualization filter 204 and the storage virtualization provider 202. This may make implementing a storage virtualization provider 202 easier by providing APIs that are simpler and more unified in appearance than calling various file system APIs directly. The APIs are intended to be redistributable and fully documented for third party's to develop storage virtualization providers for their remote storage services. Also, by implementing such a library 206, underlying provider-filter communication interfaces may be changed without breaking application compatibility.

As explained above, the storage virtualization techniques described herein may be applied to both files and directories in a computing device. For ease of illustration only, the operation of these storage virtualization techniques on files will be explained first, followed by an explanation of the operation of these techniques on directories.

Storage Virtualization for Files

In one embodiment, a file may begin either as a regular file or as a placeholder. FIG. 3A illustrates an example of a regular file 300. As shown, a regular file typically contains metadata 302 about the file (e.g., attributes, time stamps, etc.), a primary data stream 304 that holds the data of the file, and optionally one or more secondary data streams 306. In contrast, as illustrated in FIG. 3B, in one embodiment, a placeholder 308 comprises: metadata 310 for a file, which may be identical to the metadata 302 of a regular file 300; a sparse primary data stream 312 which may contain none or some data of the file (the rest of the data being stored remotely by a remote storage provider); information 314 which enables the remotely stored data for the file to be retrieved; and optionally one or more secondary data streams 316. Because all or some of the data for a file represented by a placeholder 308 is not stored as a primary data stream in the file, the placeholder 308 may consume less space in the local storage of a computing device. Note that a placeholder can at times contain all of the data of the file (for example because all of it was fetched), but as a placeholder, it is still managed by the storage virtualization filter 204 and storage virtualization provider 202 as described herein.

With reference to FIG. 3C, in one embodiment, the information 314 which enables the remotely stored data for the file to be retrieved comprises a reparse point 314. As shown, a reparse point is a data structure comprising a tag 322 and accompanying data 324. The tag 322 is used to associate the reparse point with a particular file system filter in the file system stack of the computing device. In the present embodiment, the tag identifies the reparse point as being associated with the storage virtualization filter 204. In one embodiment, the data 324 of the reparse point 314 may comprise a globally unique identifier (GUID) associated with the storage virtualization provider 202—to identify the storage virtualization provider 202 as the provider for the actual file data for the placeholder. In addition, the data 324 may comprise an identifier of the file itself, such as a file name or other file identifier.

In one embodiment, placeholders do not contain any of the file data. Rather, when there is a request to access the data of a file represented by the placeholder, the storage virtualization filter 204 must work with the storage virtualization provider 202 to fetch all of the file data, effectively restoring the full contents of the file on the local storage medium 124. However, in other embodiments, partial fetches of data are enabled. In these embodiments, some extents of the primary data stream of a file may be stored locally as part of the placeholder, while other extents are stored and managed remotely by the storage virtualization provider 202. In such embodiments, the data 324 of the reparse point of a placeholder may contain a data structure, such as an "on-disk" bitmap, that identifies extents (i.e. chunks) of the file that are stored locally versus those that are stored remotely. In one embodiment, such an on-disk bitmap may comprise a sequence of bits, where each bit represents one 4 KB chunk of the file. In other embodiments, each bit may represent a different size chunk of data. In one embodiment, a bit is set if the corresponding chunk is already present in the local storage. As described hereinafter, when a request to read an extent of a file represented by a placeholder is received, the storage virtualization filter 204 examines the on-disk bitmap to determine what parts of the file, if any, are not present on the local storage. For each range of a file that is not present, the storage virtualization filter 204 will then request the virtualization provider 202 to fetch those ranges from the remote storage.

Figure 4:
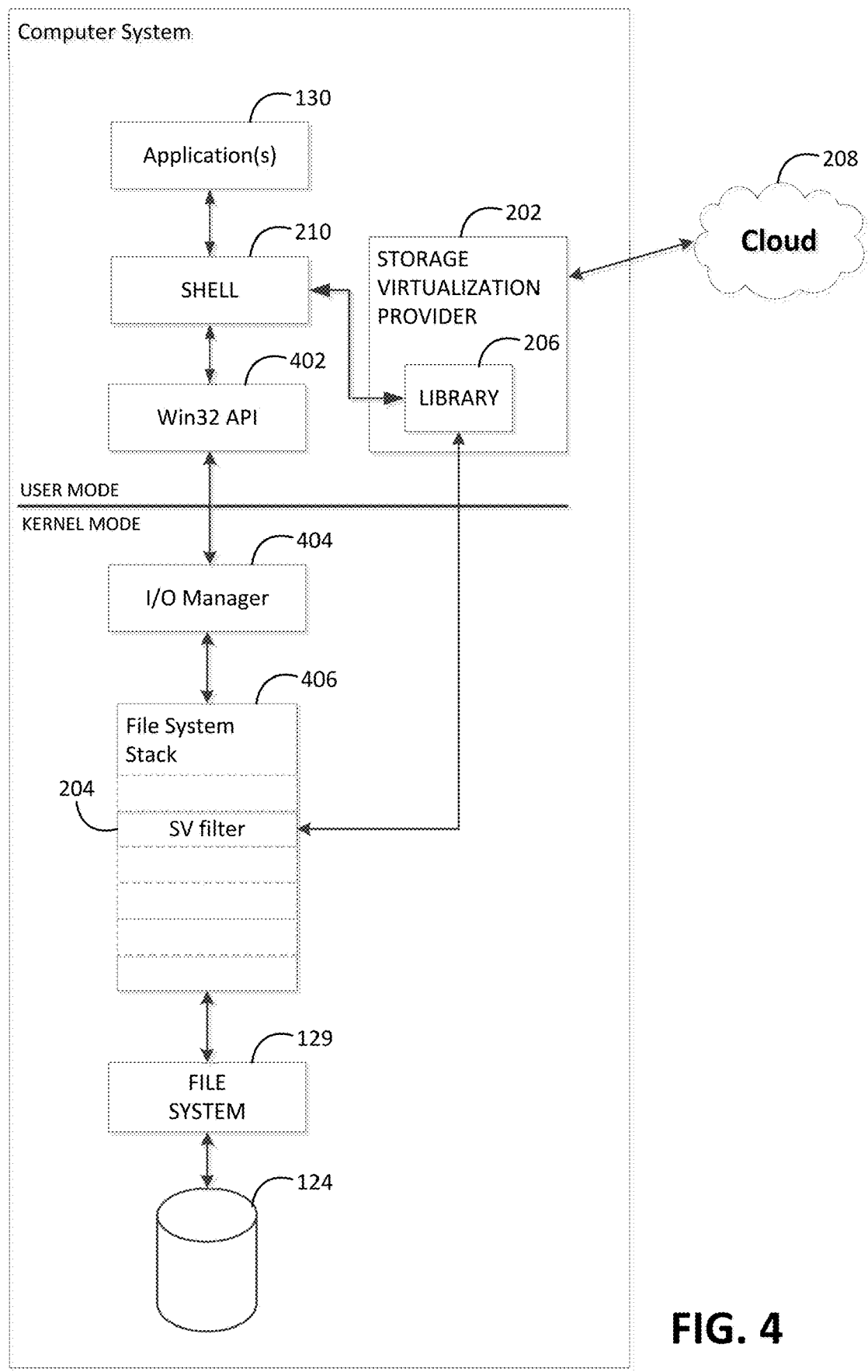
FIG. 4 illustrates further details of an architecture for storage virtualization in accordance with one embodiment.

FIG. 4 is a block diagram of the storage virtualization architecture of FIG. 2, as embodied in a computing device that implements the Microsoft Windows operating system and in which the file system 129 comprises the Microsoft NTFS file system. It is understood that the architecture illustrated in FIG. 4 is just one example, and the aspects of the storage virtualization solution described herein are in no way limited to implementation in this example environment. Rather, the aspects disclosed herein may be implemented in any suitable operating system and file system environment.

As shown in FIG. 4, an application 130 may perform file operations (e.g., create, open, read, write) by invoking an appropriate I/O call via the Win32 API 402 of the Windows operating system. These I/O calls will then be passed to an I/O Manager 404 in the kernel space of the operating system. The I/O Manager will pass the I/O call to the file system's stack, which may comprise one or more file system filters. Initially, the call will pass through these filters to the file system 129 itself. In the case of Microsoft's NTFS reparse point technology, if the file system accesses a file on disk 124 that contains a reparse point data structure, the file system will pass the I/O request back up to the stack 406. A file system filter that corresponds to the tag (i.e., globally unique identifier) of the reparse point will recognize the I/O as relating to a file whose access is to be handled by that filter. The filter will process the I/O and then pass the I/O back to the file system for proper handling as facilitated by the filter.

In the case of placeholder files described herein, the file system will pass the I/O request back up the stack to the storage virtualization filter 204, which will handle the I/O request in accordance with the methods described hereinafter.

Figure 5:
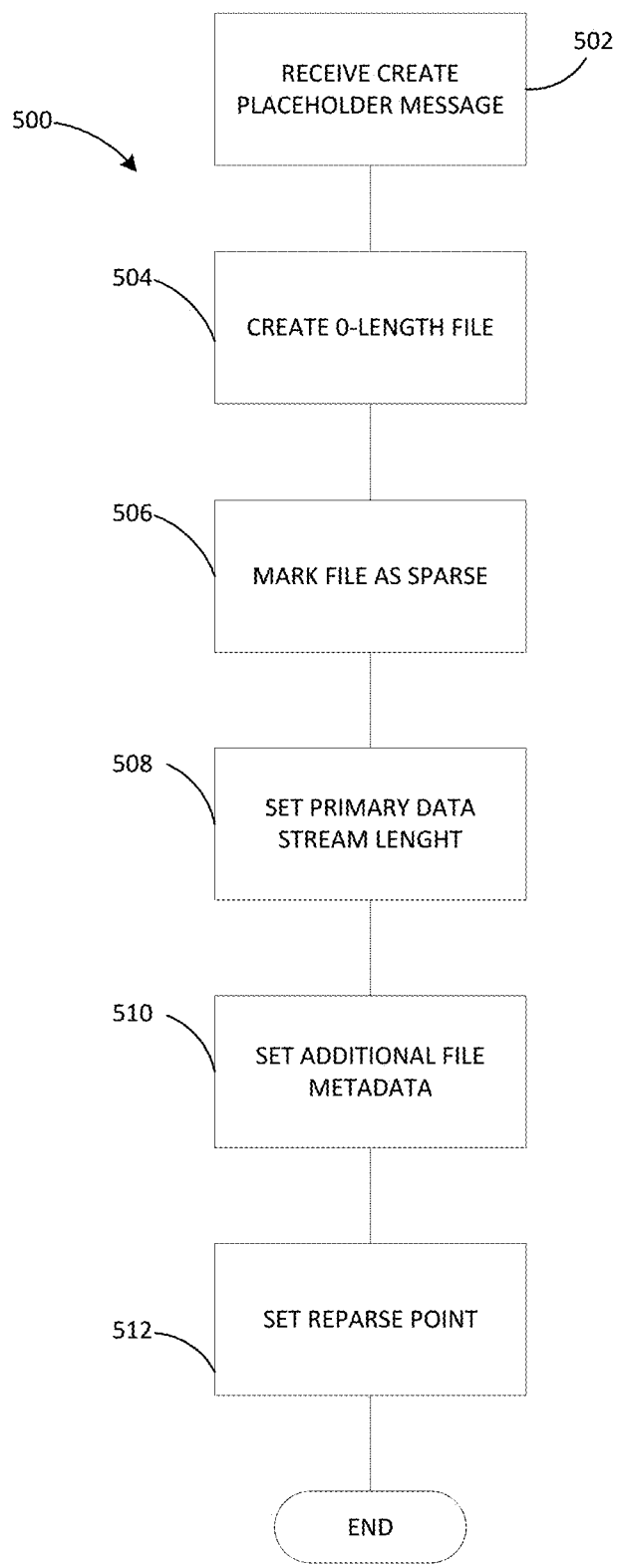
FIG. 5 illustrates a process of creating a placeholder for a file, in accordance with one embodiment.

With continued reference to FIG. 4, FIG. 5 is a flow diagram illustrating the steps performed by the storage virtualization filter 204 in order to create a placeholder for a file, in accordance with the example architecture illustrated in FIG. 4. The process may be initiated by the storage virtualization provider 202, which may call a CreatePlaceholders function of the user-mode library 206 to do so. The library 206 will, in turn, convert that call into a corresponding CreatePlaceholders message to the storage virtualization filter 204, which will receive that message in step 502 of FIG. 5. Next, in response to the CreatePlaceholders message, the storage virtualization filter 204 will create a 0-length file that serves as the placeholder, as shown at step 504. The CreatePlaceholders message will contain a file name for the placeholder, given by the storage virtualization provider 202. In step 506, the storage virtualization filter 204 will mark the 0-length file as a sparse file. In one embodiment, this may be done by setting an attribute of the metadata of the placeholder. A file that is marked as a sparse file will be recognized by the underlying file system as containing a sparse data set—typically all zeros. The file system will respond by not allocating hard disk drive space to the file (except in regions where it might contain nonzero data).

Continuing with the process illustrated in FIG. 5, in step 508, the storage virtualization filter 204 will set the primary data stream length of the file to a value given by the storage virtualization provider 202 in the CreatePlaceholders message. In step 510, the storage virtualization filter 204 sets any additional metadata for the placeholder file, such as time stamps, access control lists (ACLs), and any other metadata supplied by the storage virtualization provider 202 in the CreatePlaceholders message. Lastly, in step 512, the storage virtualization filter 204 sets the reparse point and stores it in the placeholder file. As described above in connection with FIG. 3C, the reparse point comprises a tag associating it with the storage virtualization filter 204 and data, which may include an identifier of the storage virtualization provider 202 that requested the placeholder, the file name or other file identifier given by the storage virtualization provider 202, and an on-disk bitmap or other data structure that identifies whether the placeholder contains any extents of the file data.

Once creation of the placeholder is completed, the placeholder will appear to a user or application (e.g., application(s) 130) as any other file stored locally on the computing device. That is, the details of the remote storage of the file data is effectively hidden from the applications(s).

In order for an application to issue I/O requests on a file, the application typically must first request the file system to open the file. In the present embodiment, an application will issue a CreateFile call with the OPEN_EXISTING flag set via the Win32 API. This request to open the file will flow down through the file system stack 406 to the file system 129. As described above, in the case of a placeholder file, the file system 129 will detect the presence of the reparse point in the file and will send the request back up the stack 406 where it will be intercepted by the storage virtualization filter 204. The storage virtualization filter 204 will perform operations necessary to open the file and will then reissue the request to the file system 129 in a manner that allows the file system to complete the file open operation. The file system will then return a handle for the opened file to the requesting application. At this point, the application 130 may then issue I/O calls (e.g., read, write, etc.) on the file.

Figure 6:
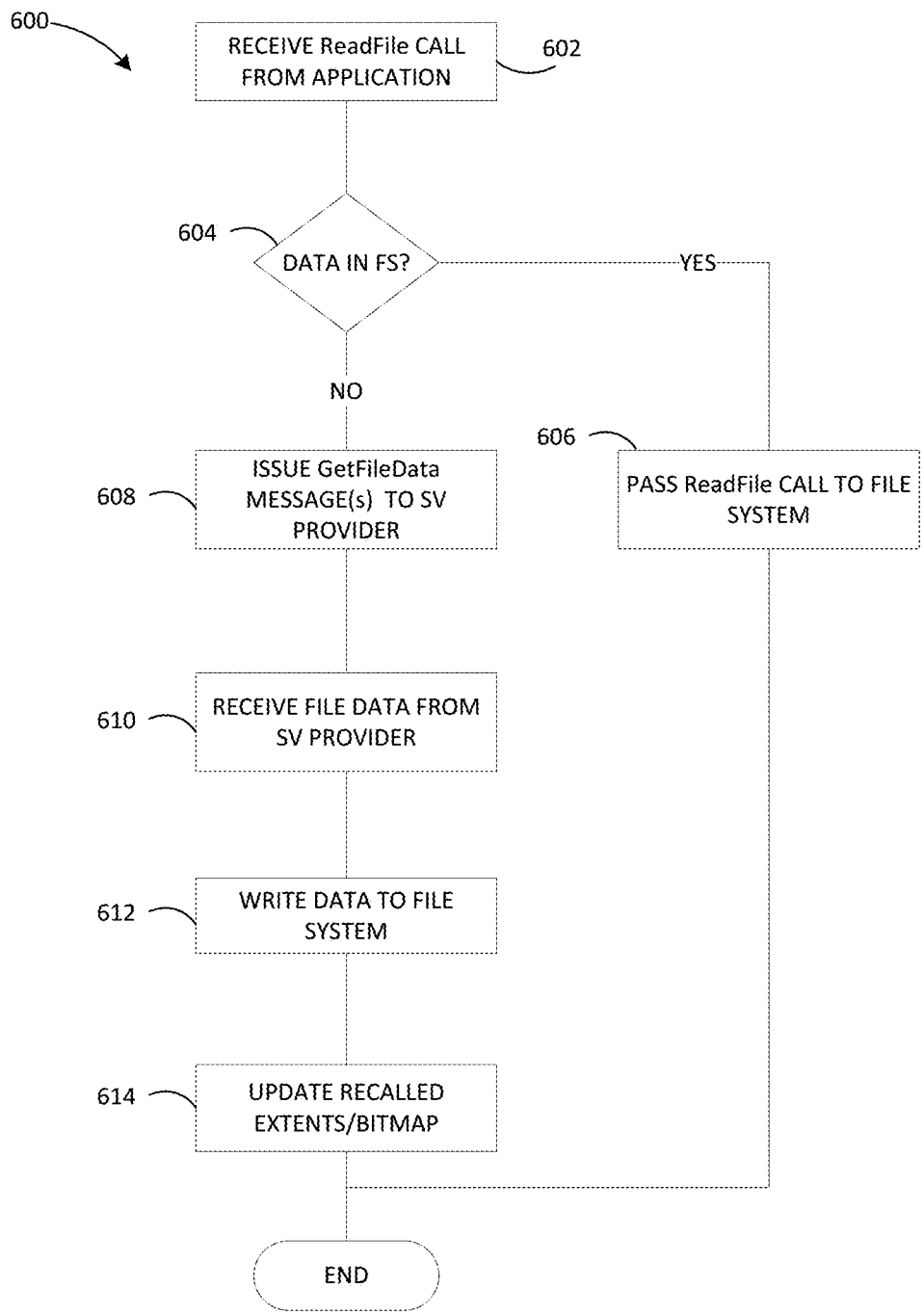
FIG. 6 illustrates a process of accessing file data for a placeholder, in accordance with one embodiment.

FIG. 6 is a flow diagram illustrating a method for processing an I/O request to read all or a portion of a file represented by a placeholder, in accordance with one embodiment. A request to read a file represented by a placeholder may come from an application 130 via the Win32 API 402 in the form of a ReadFile call. As shown, in step 602, the ReadFile call will be received by the storage virtualization filter 204. At step 604, the storage virtualization filter 204 will determine whether the requested range of data for the file is present in the placeholder or whether it is stored remotely by the storage virtualization provider 202. This determination may be made by examining the on-disk bitmap stored as part of the data of the reparse point for the placeholder. If the storage virtualization filter 204 determines that the requested range of data is stored locally (for example, because it was fetched from remote storage in connection with a prior I/O request), then in step 606 the storage virtualization filter 204 will pass the ReadFile call to the file system 129 for normal processing. The file system will then return the data to the requesting application.

Figure 7A:
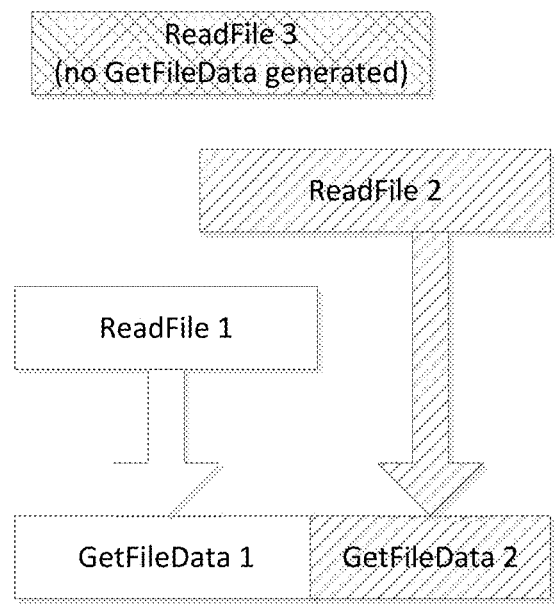
FIG. 7A illustrates example details of the file data access process of FIG. 6.

If all or some of the data is not present in the local storage, then in step 608 the storage virtualization filter 204 must formulate one or more GetFileData requests to the storage virtualization provider 202 to fetch the required data. Reads typically result in partial fetches, while some data-modifying operations may trigger fetching of the full file. Once the desired fetch range is determined, the storage virtualization filter 204 must decide whether to generate a GetFileData request for all, some, or none of the range. Preferably, the filter tries to generate a GetFileData for a particular range only once. So, if an earlier GetFileData request is outstanding, and another operation arrives whose requested range overlaps the outstanding GetFileData request, the filter 204 will trim the range needed by the second operation so that its GetFileData request to the provider 202 does not overlap the previous request. This trimming may result in no GetFileData request at all. FIG. 7A illustrates this functionality.

As shown in FIG. 7A, a second ReadFile request ("ReadFile 2") overlaps a prior request ("ReadFile 1"). So, the storage virtualization filter 204 trims the request range of the GetFileData request that it generates to the storage virtualization provider 202. A third ReadFile request ("ReadFile 3") is fully encompassed by the two prior requests, so there is no need for the filter 204 to fetch data to satisfy that request. All the data requested by ReadFile 3 will have already been fetched in response to the previous two requests. Thus, as illustrated, the storage virtualization filter 204 determines whether any portion of the remotely stored data it needs to retrieve (i.e., the data for which it has determined one or more GetFileData requests is needed) has previously been requested from the storage virtualization provider 202 but not yet received, and then if so, it trims any new requests to the storage virtualization provider so that they do not overlap with any such previously requested but not yet received data.

Figure 7B:
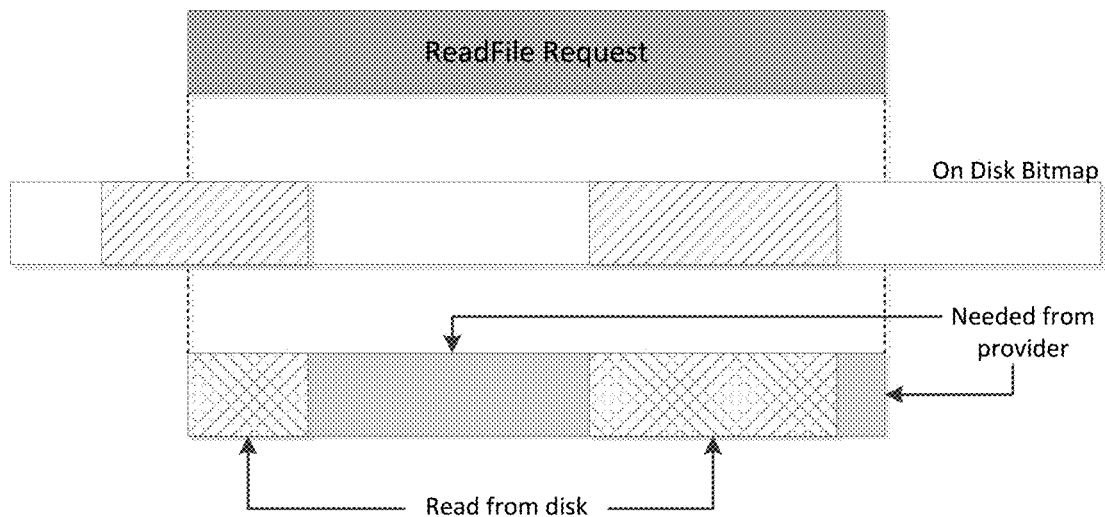
FIG. 7B illustrates additional example details of the file data access process of FIG. 6.

As illustrated in FIG. 7B, the storage virtualization filter 204 may determine which ranges of file data need to be requested from the storage virtualization provider 202 by examining the on-disk bitmap that, in one embodiment, is maintained as part of the data of the reparse point of the placeholder. The bitmap is depicted as the middle rectangle in the diagram. Ranges of the file that are already stored on disk are indicated by the hatched spaces in the bitmap. As mentioned above, each bit of the bitmap may indicate the status of a corresponding range (e.g., each bit may represent a corresponding 4 KB range) of the file represented by the placeholder. As illustrated in FIG. 7B, after examining the bitmap, the storage virtualization filter 204 is able to determine which data can be read from disk and which data is needed from the storage virtualization provider 202. The bottom rectangle illustrates the result of comparing the ReadFile request with the on-disk bitmap. The regions the filter will read from disk are indicated, as are the regions the filter will need to obtain from the provider 202.

In one embodiment, the storage virtualization filter 204 may also maintain a tree of in-flight GetFileData requests for each file. Each entry in the tree records the offset and length of data the filter has requested from the provider and not yet received. The tree may be indexed by the file offset. For each region the filter 204 determines is not yet present, the filter 204 may consult the in-flight tree to determine whether any of the regions it may need have already been requested. This may result in further splitting of the GetFileData requests. Once the filter has determined the final set of GetFileData requests it needs to send, it may insert the GetFileData requests into the in-flight tree and sends them to the provider 202.

Referring again to FIG. 6, the storage virtualization filter 204 will issue any necessary GetFileData requests to the storage virtualization provider 202 in step 608. Upon receipt, the user-mode library incorporated in the storage virtualization provider 202 will invoke a corresponding GetFileData callback function implemented by the storage virtualization provider 202. The storage virtualization provider 202 will then perform operations necessary to retrieve the requested data from remote storage on the network. The storage virtualization provider 202 will then return the data to the library 206, and in step 610, the requested file data is returned to the storage virtualization filter 204. At this point, there are two alternatives.

In one alternative, the storage virtualization filter issues a WriteFile request to the file system 129 requesting that the fetched data be written to the data stream of the placeholder. Then, in step 614, the storage virtualization filter 204 will update the on-disk bitmap to indicate that the particular range(s) of data now resides on disk. Note that in one embodiment, the storage virtualization filter 204 makes a distinction between unmodified resident data and modified resident data, and this distinction can potentially help with differential syncing of resident and remote data.

Alternatively, in accordance with another feature of the storage virtualization solution described herein, instead of writing the fetched data to disk, the storage virtualization filter 204 may return the requested data to the application 130 directly, without storing the data on disk. This may be advantageous in situations where disk space is already limited. This feature may also be used to implement a form of data streaming from the remote storage to the requesting application.

According to another aspect of the storage virtualization techniques described herein, the storage virtualization filter 204 may also initiate and manage the conversion of a regular file to a placeholder. During this process, a placeholder will be created for the file as described above, and the data of the primary data stream of the regular file will be sent to the storage virtualization provider 202 for remote storage on the network. For ease of description only, the method of converting a regular file to a placeholder and moving its primary data stream data to remote storage may be referred to as "dehydration," and the method of fetching the remotely stored data of a placeholder from remote storage and writing it back to disk may be referred to as "hydration."

Storage Virtualization for Directories

The storage virtualization techniques described herein may also be applied to directories in a manner similar to how files are treated. In many file systems, directories are implemented as files themselves. As illustrated in FIG. 8A, a directory typically comprises metadata 802 which provides various information about the directory, such as the name of the directory, its length, time of creation, and other information useful to the file system or an application. In addition to the metadata 802, the directory will also contain one or more child directory entries 804. Each child entry may represent a file within the directory or a subdirectory of the directory. For example, a child entry for a file may contain a field that stores attributes associated with the file (such as whether the file is "read only" or "hidden"), a field that stores characters of a file name for the file, one or more fields storing information indicating the date and time of file creation, a field indicating a size of the file, and a field indicating a starting location (e.g., starting cluster) on the storage medium where the data for the file resides. Of course, this is just one example of the format and contents of a child entry, and it is understood that the formats and contents of child entries may differ from file system to file system. A child entry for a subdirectory may comprise similar fields for the file representing the subdirectory. Often a directory is part of a larger hierarchy of directories. The top most directory of such a hierarchy is often referred to as the root directory.

In accordance with the storage virtualization techniques disclosed herein, a placeholder may be created for a directory. FIG. 8B illustrate an example placeholder for a directory. As shown, the placeholder may comprise a file containing: metadata 808, which may include some or all of the metadata 802 of a full directory; none, some, or all child entries 810 of the directory; and information 812 which enables any remotely stored child entries for the directory to be retrieved. Because all or some of the child entries for a directory represented by placeholder directory 806 may not be stored in the directory on secondary storage (e.g., disk 124), the placeholder directory 806 may consume less space in the local storage of a computing device.

With reference to FIG. 8C, in one embodiment, the information 812 which enables the remotely stored child entries for the directory to be retrieved comprises a reparse point 814. As shown, the reparse point 814 is a data structure comprising a tag 816 and accompanying data 818. As described above, the tag is used to associate the reparse point with a particular file system filter in the file system stack of the computing device. In the present embodiment, the tag identifies the reparse point as being associated with the storage virtualization filter 204. In one embodiment, the data 818 of the reparse point 814 may comprise a globally unique identifier associated with the storage virtualization provider 202—to identify the storage virtualization provider 202 as the provider for the actual child entries for the placeholder directory. In addition, the data 818 may comprise an identifier of the directory itself, such as a directory name or other directory identifier.

As in the case of placeholders for files, a storage virtualization provider 202 that is maintaining a full directory hierarchy on remote storage over a network may request that a placeholder be created for a directory. In the case of directories, however, the storage virtualization provider 202 may initially request creation of a placeholder only for the root directory in a remotely stored directory hierarchy. Then, when an application begins to enumerate that directory, the storage virtualization provider 202 may request the creation of additional placeholders for the child directories (i.e., subdirectories) and/or the files under the root directory. As used herein, the phrase "enumerate a directory" and the like refers to a process by which the contents of a directory, including any files or subdirectories (each of which is represented in the directory by one or more respective child entries), may be examined or retrieved (such as in the form a directory listing) upon request to the file system of a computing device.

As with the creation of placeholders for files, the storage virtualization provider 202 can request the creation of a placeholder for a directory, for example, by calling a CreatePlaceholders function of the user-mode library 206. In that example implementation, the library 206 will, in turn, convert that call into a corresponding CreatePlaceholders message to the storage virtualization filter 502. In response to the CreatePlaceholders message, the storage virtualization filter 204 will create an empty directory (i.e., an empty file) that serves as the placeholder for the directory. The storage virtualization filter 204 may then store in the placeholder directory any additional metadata associated with the directory, such as time stamps, access control lists (ACLs), and other metadata supplied by the storage virtualization provider 202 in the CreatePlaceholders message. The storage virtualization filter 204 will then add to the placeholder information which enables any remotely stored child entries of the directory to be retrieved from remote storage. In the embodiment illustrated in FIG. 8C, this information may comprise a reparse point. As described above in connection with FIG. 8C, the reparse point comprises a tag associating it with the storage virtualization filter 204 and data, which may include an identifier of the storage virtualization provider 202 that requested the placeholder and the directory name or other directory identifier given by the storage virtualization provider 202.

Once creation of the placeholder for the directory is completed, the placeholder will appear to a user or application (e.g., application(s) 130) as a directory stored locally on the computing device. That is, the details of the remote storage of the directory is effectively hidden from the applications(s).

Figure 9:
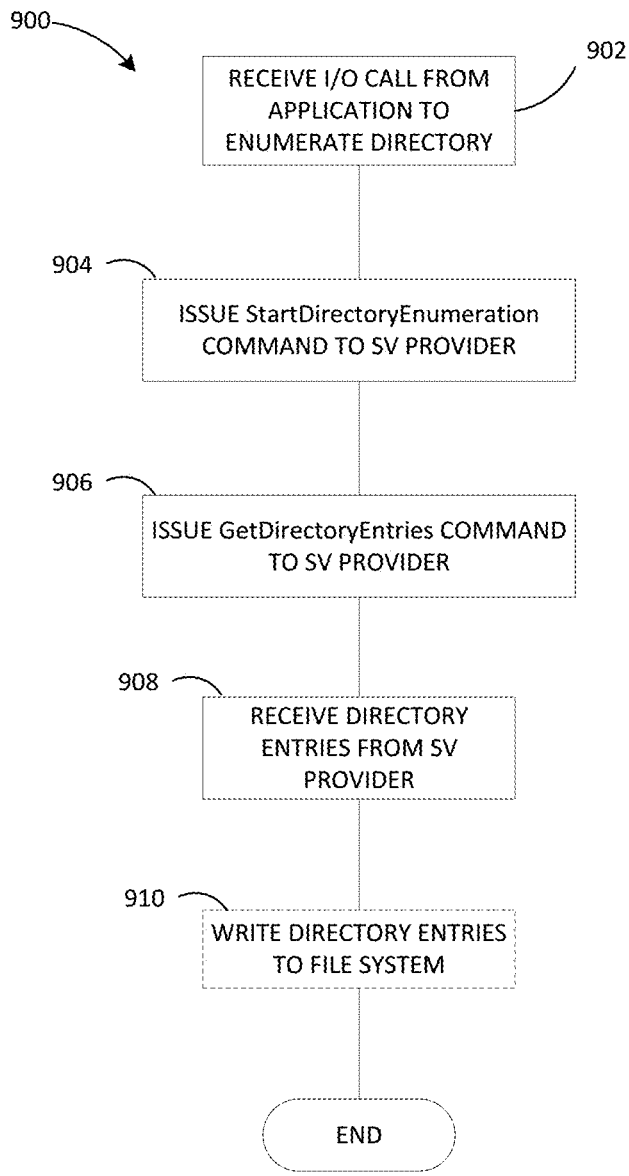
FIG. 9 illustrates a process for enumeration of a placeholder directory, in accordance with one embodiment.

The process for enumeration of a directory represented by a placeholder is similar to the process illustrated in FIG. 6 for accessing data of a placeholder for a file. FIG. 9 illustrates the steps performed by the storage virtualization filter 204 for directory enumeration, in accordance with one embodiment. An application will typically initiate directory enumeration via, for example, a Win32 API call requiring the directory to be enumerated, such as a request to list the contents of the directory or a request to access a file having the directory in its directory path. As in the case of files, this I/O call or request will be passed to the file system 129, which, in the embodiment illustrated herein, will detect the reparse point in the directory placeholder and pass the I/O call back up the file system stack to the storage virtualization filter 204 for processing.

As shown in FIG. 9, in one embodiment, the storage virtualization filter 204 will begin the process at step 902 by issuing a StartDirectoryEnumeration command to the storage virtualization provider 202. Upon receiving this command, the storage virtualization provider 202 will establish a context that can be used throughout a set of enumeration requests for the directory. The StartDirectoryEnumeration command will include the pathname from the root of the remotely stored directory hierarchy to the directory to be enumerated. In step 906, the storage virtualization filter will issue a GetDirectoryEntries command to the storage virtualization provider 202 to request that the storage virtualization provider 202 fetch (i.e., retrieve) all or some range (e.g., 1 to N) of child directory entries of the directory from the remote storage. In one embodiment, the first GetDirectoryEntries command may include a search string, and the storage virtualization provider 202 may only fetch the directory entries that match this search string. The search string could be a full file name, e.g. foo.txt or a wild card name, e.g. foo*. In response to the GetDirectoryEntries command, the library 206 will invoke a corresponding callback function implemented by the storage virtualization provider 202, which will cause the storage virtualization provider 202 to fetch the requested entries from the remote storage and return them to the storage virtualization filter 204. In step 908, the storage virtualization filter 204 receives the fetched directory entries from the storage virtualization provider 202. The received entries may then be returned to the requesting application or other entity that may have triggered the enumeration.

In one embodiment, as illustrated in optional step 910, the child entries received in step 908 may be written to the placeholder for the directory on the secondary storage (e.g., storage 124) of the computing device. This may result in a partial representation of the directory on the secondary storage. On subsequent enumerations, this may result in faster processing, as the child entries needed to satisfy a subsequent enumeration may actually be stored locally on the secondary storage within the placeholder of the enumerated directory. Also, when at least some of the child entries of a directory are stored locally on the secondary storage, the storage virtualization filter 204 may respond to a subsequent enumeration request for the directory by enumerating both the locally stored child entries and the remotely stored child entries and then merging the results before returning the enumerated entries to the requesting application. In one embodiment, in the event of any conflicting entries during that merging process, the locally stored child entries may take precedence over the child entries retrieved from remote storage. That is, if there are versions of the same child entry in both the local storage (e.g., within the directory placeholder on the secondary storage) and in the remotely stored representation of the directory, the locally stored version will be returned to the requesting application instead of the version retrieved from remote storage. Alternatively, in other embodiments, a policy may be established by which the child entries retrieved from remote storage take precedence over any locally stored child entries.

Once the enumeration is completed, in one embodiment, the storage virtualization filter 204 may end the enumeration process by issuing a EndDirectoryEnumeration command to the storage virtualization provider 202, and upon receiving this command, the storage virtualization provider 202 will free any resource(s), e.g. memory or opened handles, used during the process.

The process of writing fetched child entries to local storage is different for directories than it is for files. As mentioned above, the storage virtualization provider 202 may initially request creation of a placeholder directory only for the root directory in a remotely stored directory hierarchy. Then, when an application begins to enumerate that directory, the storage virtualization provider 202 may request the creation of additional placeholders for the child subdirectories and/or the files under the root. Alternatively, the storage virtualization filter 204 may decide whether to create additional placeholders for the child subdirectories and/or the files under the root. For example, the remotely stored directory hierarchy maintained by the storage virtualization provider 202 on remote storage may have the hierarchy illustrated in FIG. 10. As shown, the example hierarchy has a root directory called "foo," which contains files "1.txt," "2.txt," "3.txt" and a subdirectory called "bar." When the application requests to enumerate the root directory foo, the process described above will return the child entries for the files 1.txt, 2.txt, and 3.txt and the child entry for the subdirectory bar. But at that point, the only item stored on the secondary storage of the computing device is the directory foo. Accordingly, in conjunction with this directory enumeration, the storage virtualization provider 202 may also then request the storage virtualization filter 204 to create placeholders for each of the files 1.txt, 2.txt, and 3.txt and for the subdirectory bar.

Continuing this example, at this point the on-disk representation of the directory hierarchy will include the directory foo, and the placeholders for 1.txt, 2.txt, and 3.txt and the subdirectory bar. Suppose that the remotely stored virtualized directory hierarchy further includes a file with the path foo\bar\foo1\bar1\5.txt and that an application requests that file. The storage virtualization filter 204 will need to fetch and create placeholders for each of the additional subdirectories foo1 and bar1 as well as the file 5.txt. In accordance with the storage virtualization techniques disclosed herein, the storage virtualization filter 204 can request this all at once or it can be requested in an iterative process.

More specifically, in one embodiment, the storage virtualization filter 204 may attach a reparse processing flag to the request so that when the application's request for that file reaches the file system, if the last component of the partial on-disk directory hierarchy representation ("bar" in the example) contains the reparse point tag of the storage virtualization filter 204, the file system will complete the request with STATUS_REPARSE.

In the virtualization filter's handler to this status code, it issues a GetPlaceholderInformation command to the storage virtualization provider 202 with the name of the next component relative to the virtualization root, e.g., bar\foo1 in the present example. Upon receiving this command, the storage virtualization provider 202 checks if the requested path exists in the remote storage, and if yes, the virtualization provider 202 returns to the storage virtualization filter 204 the information necessary to create a placeholder for foo1. The storage virtualization filter 204 will then create a file named foo1 under the foo\bar\ folder that serves as the placeholder for foo1 and set the reparse point on this file, then re-issue the application's request. The virtualization filter 204 will repeat the process to have placeholders for the components bar1 and 5.txt created. Note that in other embodiments, instead of the virtualization filter 204 automatically creating a placeholder for each component upon receiving from the virtualization provider 202 the information necessary to create the placeholder, the virtualization provider 202 may instead request the creation of a placeholder for each component by calling the CreatePlaceholders function of the user-mode library as it iterates through each component of the path.

After 5.txt is created on the secondary storage, since 5.txt is the last component in the request, the virtualization filter 204 will clear the reparse processing flag before re-issuing the request. The file system 129 will then complete the request with STATUS_SUCCESS this time so that the request will complete and return to the application.

Figure 10:
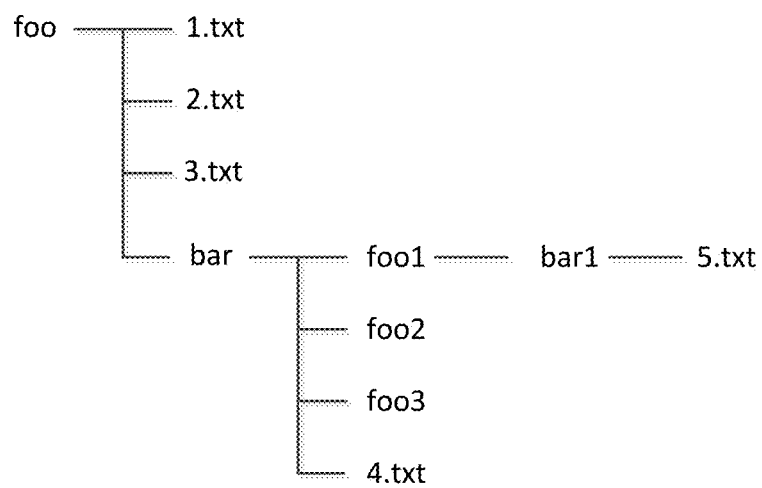
FIG. 10 is a diagram of an example directory hierarchy.

Because of the nature of directory enumeration, it is possible that the local on-disk representation of a directory hierarchy—using placeholders—may not be complete. For example, when enumerating the path foo\bar\foo1\bar1\5.txt, placeholders may be created for subdirectories foo1 and bar1 and the file 5.txt. However, it could be the case that the directory foo\bar also contains subdirectories foo2 and foo3 (as illustrated in FIG. 10). Placeholders may not have been created for those subdirectories. Thus, the placeholders for the subdirectories foo, bar, foo1, bar1, and 5.txt may form a partial representation of the full directory hierarchy stored remotely on the network. Moreover, it is possible for an application to make changes to the local on-disk representation. For example, an application may create a new file 6.txt in the directory foo\bar\foo1\bar1. Or the application could delete the file 5.txt from that directory or rename the file. According to a further aspect of the storage virtualization techniques described herein, the storage virtualization filter 204 and storage virtualization provider 202 may perform a synchronization operation to ensure that any partial representation of the directory hierarchy on disk remains synchronized with the corresponding portion of the full directory hierarchy on the remote storage.

Because a goal of the storage virtualization techniques disclosed herein is to hide the details of the remote storage from applications such that the existence of directories and files appears to an application as if they were all stored and maintained locally, any changes to the on-disk representation by an application should take precedence. Accordingly, when changes are made by the file system in response to a request from an application, such as deleting or renaming a file, a mechanism is needed to inform the storage virtualization provider 202 during a merge operation that such a change has occurred to ensure that other applications will not be able to open or see this file in subsequent directory enumerations. In accordance with another aspect of the storage virtualization techniques disclosed herein, the concept of a tombstone is introduced. A tombstone is information that remains on the secondary storage of the computer device (e.g., disk 124) after a file or directory represented by a placeholder is deleted or renamed by an application. In one embodiment, a tombstone may be implemented by a new flag or attribute in the metadata of a placeholder for a file or directory that has been deleted. The flag indicates that the file or directory has been deleted or renamed, and the storage virtualization filter 204 and storage virtualization provider 202 may cooperate to ensure that the deletion or renaming represented by the tombstone is made to the full directory hierarchy on the remote storage when synchronizing the on-disk and remote storage representations.

Metadata Storage for Placeholders

With reference to FIG. 3A, a regular file may contain metadata 302 about the file (e.g., attributes, time stamps, etc.), a primary data stream 304 that holds the data of the file, and optionally one or more secondary data streams 306. A computing device storing the file may be configured to generate the metadata 302 for the file based on information contained in the primary data stream 304 of the file. In contrast, as illustrated in FIG. 3B, a placeholder 308 for a file may comprises: metadata 310 for the file, which may be identical to the metadata 302 of a regular file 300; a sparse primary data stream 312 which may contain none or some data of the file; information 314 which enables the remotely stored data for the file to be retrieved; and optionally one or more secondary data streams 316. A computing device storing the placeholder for the file 308 may be unable to generate metadata 302 for the placeholder 308 of the file since the sparse primary data stream 312 may contain none or only a portion of the data needed to generate the metadata 302 about the file. The remainder of the data of the file needed to generate the metadata 302 may be stored remotely by a remote storage provider.

In an example computing device, such as computing device 112 illustrated in FIG. 4, an indexer (not shown) may be configured to identify properties of files stored on the computing device 112 and to store those properties in a database on the computing device 112, such as the secondary storage 124. For example, one type of property stored in the secondary storage may be properties that are part of the metadata of the file, such as a time stamp or a size of the file. A second type of property stored in the secondary storage may be properties that can be obtained by reading the contents of the file itself, such as an artist or track length in an example that the file is a music file. These properties may be stored in the secondary storage 124 and later retrieved by the indexer using a search function of the computing device 112. However, when some or all of the data associated with the file is being stored remotely by a remote storage provider rather than on the computing device itself, the computing device 112 may be unable to generate the metadata 302 for the given file because the indexer does not have access to the contents of the file needed to generate the metadata. Thus, the computing device 112 may need to rely on the remote storage provider (e.g., storage virtualization provider 202) to generate the metadata 302.

Figure 11:
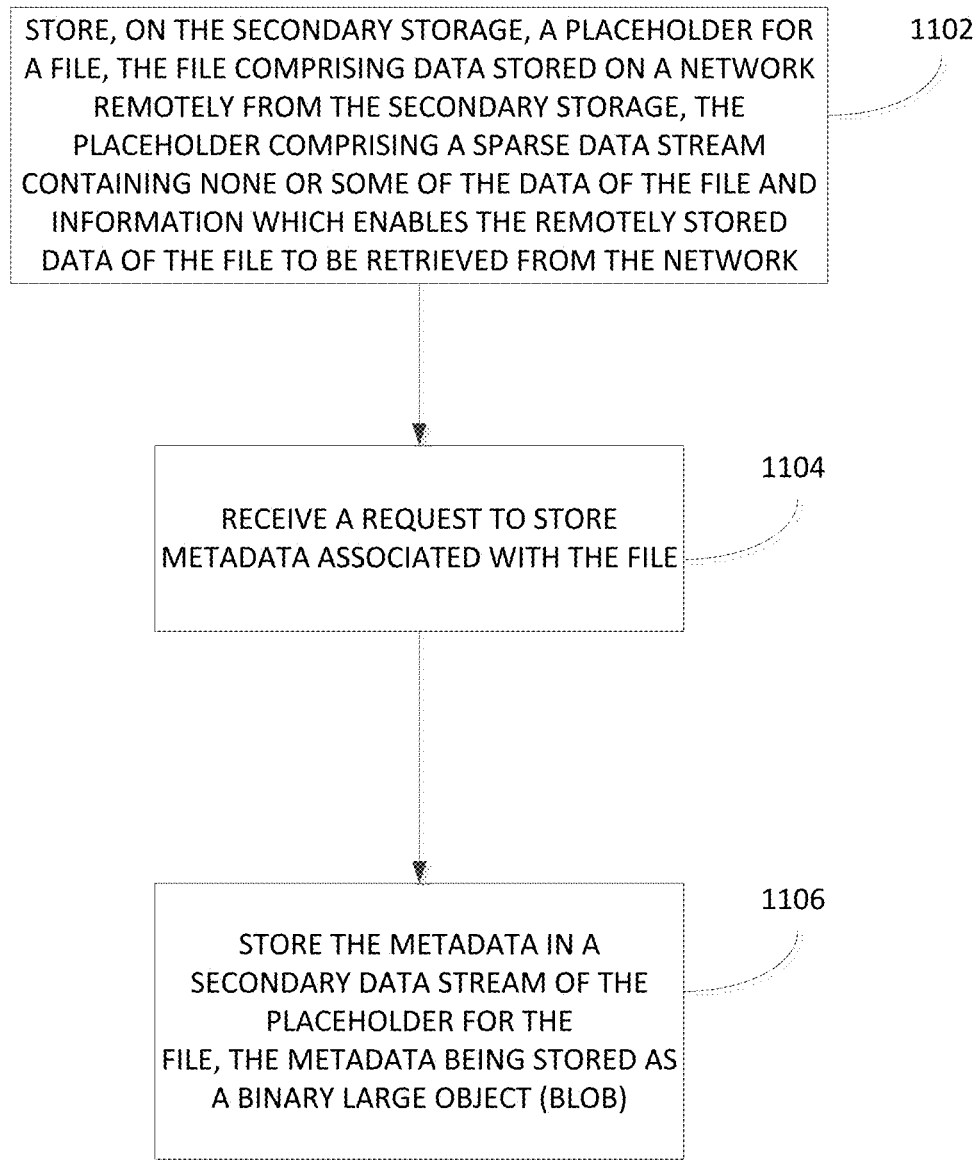
FIG. 11 illustrates a process for storing metadata in a secondary data stream of a placeholder for a file.

FIG. 11 illustrates an example method for receiving metadata associated with a file whose contents are stored remotely and storing that metadata in the secondary storage of a computing device. The method may be implemented in a computing device comprising a processor, memory, and secondary storage, such as computing device 112.

At step 1102, a placeholder for a file may be stored on the secondary storage of the computing device. The secondary storage may be, for example, the disk storage 124 illustrated in FIG. 1. The files may comprise data at least some of which is stored on a network remotely from the secondary storage, such as the network (e.g., cloud) 208. The placeholder may be generated by the storage virtualization filter 204 and may appear to a user or application as a regular file or directory on the computing device. However, the placeholder may not contain all or even any of the data of the file or directory. For example, the storage virtualization provider 202 may store all or at least some of the data associated with the file in the remote network. Each of the placeholders may comprise a sparse data stream containing none or some data of the file and information which enables the remotely stored data of the file to be retrieved from the network.

At step 1104, a request to store metadata associated with the file may be received. The request to store metadata associated with the file may be received, for example, by the storage virtualization filter 204 from the shell 210. Or, in some embodiments, the request may be received directly from an application or other module running on the computing device, such as the storage virtualization provider 202. The storage virtualization filter 204 may create and manage the placeholders for the files and directories, as well as metadata associated with the files and directories, and may notify the user-mode storage virtualization provider 202 of access attempts to the files or directories whose data is managed by the filter 204 and provider 202.

At step 1106, the metadata may be stored by the storage virtualization filter 204 in a secondary data stream of the placeholder for the given file. The metadata may be stored in the secondary data stream as a Binary Large Object (BLOB). A BLOB may be a collection of binary data (e.g., images, audio or other multimedia objects) stored as a single entity. In one example, the secondary data stream of the placeholder for the given file may hold a plurality of BLOBs, each containing different metadata associated with the file. Each BLOB may store a particular type of metadata.

Figure 12:
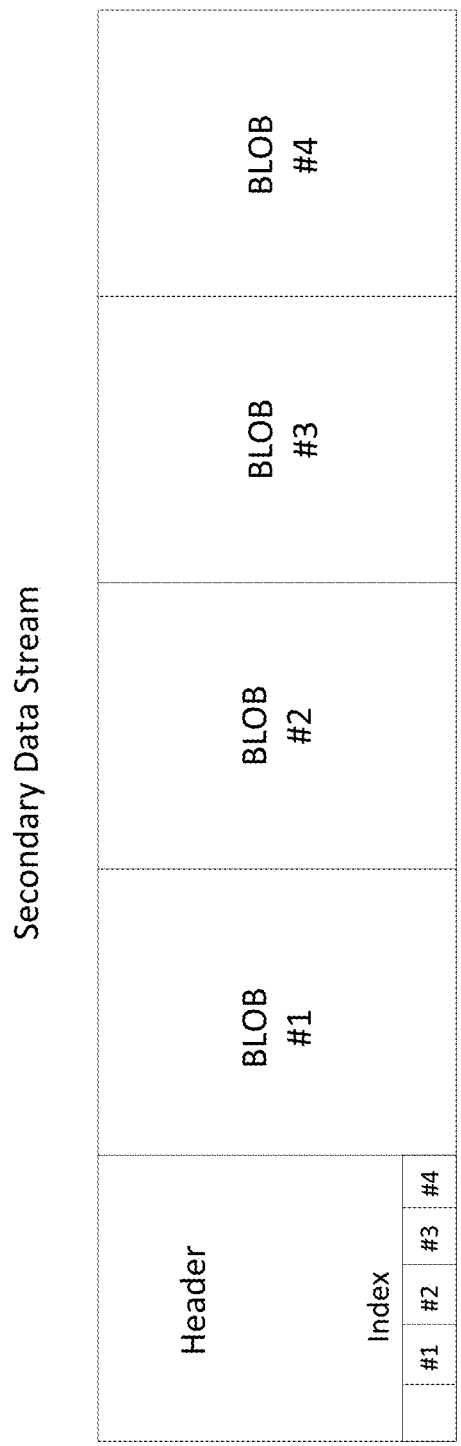
FIG. 12 shows an example secondary data stream.

An example illustration of a secondary data stream of a placeholder in which one or BLOBs may be stored is shown in FIG. 12. The secondary data stream may be named based, for example, on one or more characteristics of the secondary data stream. The secondary data stream may have properties similar to those of a primary data stream. For example, read and write operations of the secondary data stream may be performed using the same data stream APIs used for the primary data stream. As shown in FIG. 9, the secondary data stream may comprise a header for storing information about the secondary data stream and the one or more BLOBs stored in the secondary data stream. For example, a first portion of the header may comprise general information about the secondary data stream, such as the size of the data stream, the location of certain characteristics of the data stream, etc. The header of the secondary data stream may further comprise information about each of the one or more BLOBs stored in the secondary data stream. After the header, the secondary data stream may further comprise a property region for storage of the one or more BLOBs. When more than one BLOB is stored on a data stream, the BLOBs may be offset from one another such that the content of the BLOBs does not overlap. There may also be empty space between BLOBs to allow for growth of one or more of the BLOBs. One or more of the BLOBs may also be compressed using a variety of compression algorithms in the secondary data stream in order to save space. The offset and compression properties of the one or more BLOBs in the secondary data stream may be stored in the header in the form of an index, each BLOB having its own entry in the index that specifies the offset of that BLOB (e.g., in bytes) within the secondary data stream and optionally also any other properties of the BLOB, such as any compression properties. Additionally or alternatively, the offset and compression information may be stored within the BLOB itself.

The storage virtualization filter 204 illustrated in FIG. 4 may perform the storage of the one or more BLOBs. However, the storage virtualization filter 204 may not be aware of the properties contained within the BLOBs. In other words, the properties of the BLOBs may be opaque to the storage virtualization filter 204. In one embodiment, the storage virtualization filter 204 may simply be aware that there is a BLOB of a certain size with opaque properties, and that some higher level entity (e.g., the shell 210) is acting to store this BLOB or to retrieve this BLOB from the secondary storage.

As further shown in FIG. 4, the shell 210 may be run in the user mode of the computing device 112. The shell 210 may facilitate communication between an application 130 or the storage virtualization provider 202 and the storage virtualization filter 204 running in the kernel mode of the computing device 112. For example, the shell 210 may expose an API to at least one of the application 130 or the storage virtualization provider 202 to allow the application or storage virtualization provider to communicate with the storage virtualization filter 204. In one embodiment, the shell 210 may call a storage virtualization filter API to instruct the storage virtualization filter 204 to store the one or more BLOBs in the secondary storage, such as the disk storage 124. The shell 210 may be capable of accessing the properties of the one or more BLOBs.

Figure 13:
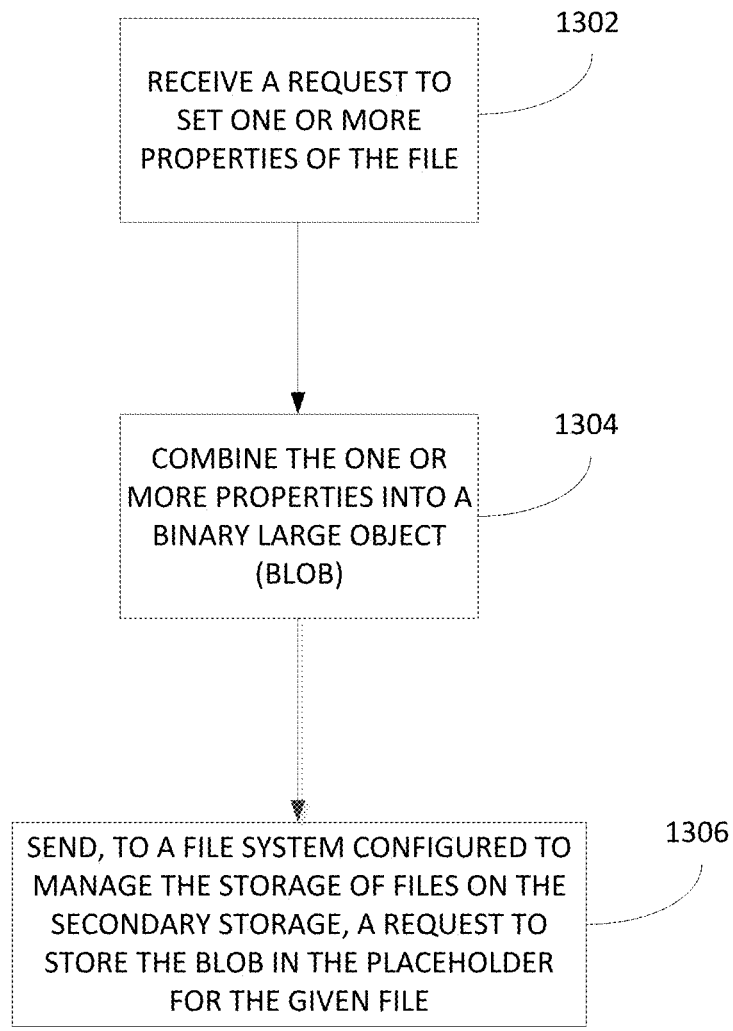
FIG. 13 illustrates a process for creating and storing a Binary Large Object (BLOB).

FIG. 13 illustrates an example method 1300 implemented by the shell 210 for the storage virtualization of files. The shell may expose an application program interface (API) for use by at least one of an application or a storage virtualization provider for the storage of metadata in the secondary storage of the computing device. The secondary storage may have stored thereon a placeholder for a file, the file comprising data at least some of which is stored on a network remotely from the secondary storage. The placeholder may comprise a sparse data stream containing none or some data of the file and information which enables the remotely stored data of the file to be retrieved from the network.

At step 1302, the shell 210 may receive a request to set one or more properties of the file. For example, the shell 210 may receive a request from at least one of an application 130 or the storage virtualization provider 202 to set properties that are part of the metadata of the file, such as a time stamp or a size of the file. Additionally or alternatively, the shell 210 may receive a request from at least one of an application 130 or the storage virtualization provider 202 to set properties that can be obtained by reading the contents of the file itself, such as an artist or track length in an example that the file is a music file. In one embodiment, in which the underlying operating system of the computing device is a WINDOWS operating system available from Microsoft Corporation, the request to set one or more properties of a file may be received in the form of a method call to an iPropertyStore interface supported by the operating system.

At step 1304, the shell 210 may combine the one or more properties into a Binary Large Object (BLOB) and, at step 1306, the shell 210 may send, to a file system configured to manage the storage of files on the secondary storage, a request to store the BLOB in the placeholder for the given file. In one example, the request to store the BLOB in the placeholder for the given file may comprise a request to store the BLOB in a secondary data stream of the placeholder for the given file.

A BLOB may be associated with a BLOB identifier so that the shell 210 may associate certain properties with the BLOB based on the BLOB identifier. In one embodiment, the BLOB identifier may be assigned to the BLOB by one of the shell 210 or the storage virtualization filter 204. The identifier may be a number, such as a 32 bit integer. In one embodiment, the identifier may be a globally unique identifier (GUID). Some of those bits may be reserved for the placement of "flags" that may influence certain behaviors of the storage virtualization filter 204. For example, a given flag may indicate that the BLOB may only be stored on a placeholder and never on a non-placeholder file. Thus, if that placeholder ever gets converted to a non-placeholder file (e.g., through hydration of the file), the storage virtualization filter 204 may delete the BLOB with the placeholder only flag.

In one embodiment, an application or the storage virtualization provider 202 may be configured to communicate with the shell 210 to set or retrieve property values of the one or more BLOBs. In this example, the request to store metadata associated with a given file may originate in the application or the storage virtualization provider 202. The application or the storage virtualization provider 202 may be aware of the specific properties of the file. In order to set property values for a given BLOB, the application or the storage virtualization provider 202 may send a message to the shell 210 requesting that the shell set the properties on the file. In one embodiment, this request may take the form of an IProperty API from the application or storage virtualization provider to the shell. The shell 210 may then form a BLOB that holds those property values and call a storage virtualization filter API to store the BLOB in the placeholder for the file (e.g., in a secondary data stream of the placeholder) on the secondary storage.

In another example, an application 130 may want to query a property of a BLOB stored in the secondary storage. For example, the application 130 may be a music application that wants to query the author of a given song file. The application 130 may communicate with the shell 210 to retrieve the requested properties from the BLOB. In response to this communication, the shell 210 may retrieve the information from the storage virtualization filter 204 using an appropriate API call to the storage virtualization filter 204.

A number of operations may be performed on the one or more BLOBs stored within a placeholder for a file on the secondary storage, such as storing, retrieving, locking, and unlocking a BLOB. However, it is understood that the operations are not limited to these four operations. In order to store or retrieve a BLOB, the shell 210 may call a store properties API or a retrieve properties API, respectively, of the storage virtualization filter 204. For example, in response to a request from an application or the storage virtualization provider to set a property of an existing music file, such as the name of an artist of the music file, the shell 210 may form a BLOB containing that property and then call the store properties API of the storage virtualization filter 204 in order to have the BLOB stored in the placeholder for the file. In order to retrieve the metadata stored in a BLOB, the shell may call the retrieve properties API of the storage virtualization filter 204 to have the BLOB containing that metadata retrieved from the placeholder for the file. In one embodiment, the APIs may be used to store or retrieve two or more BLOBs at a time. Thus, the operations may operate on a set of BLOBs at once. If the secondary data stream has not been created by the first time a store or retrieve API is called, the storage virtualization filter 204 may be configured to automatically create the secondary data stream.

The store properties API may be used to update an existing BLOB stored in an alternate data stream. When the store properties API is called to store a BLOB having the same unique identifier as an existing BLOB, the entirety of the existing BLOB may be overwritten with the new BLOB, thus effectively updating it. However, the BLOB identifier may remain unchanged. The store properties API may also be used to delete an existing BLOB. To delete an existing BLOB, the shell may call the store properties API with the identifier of the BLOB to be deleted and an indication that the BLOB has a length of 0. When such a store properties API call is received, the storage virtualization filter 204 will delete the BLOB. Thus, with the same store properties API, a BLOB may be added, updated, or deleted from the secondary data stream of a placeholder. The retrieve properties API may not modify the secondary data stream at all.

In addition to the shell, other applications, modules, or components may also be able to store, retrieve, update, and retrieve stored BLOBs also. If the shell or an application, for example, wants to perform a series of operations on a particular BLOB and does not want other applications to be able to read that BLOB or make modifications to that BLOB, the application may lock the BLOB using a lock properties API. A given application may lock multiple BLOBs using a single lock properties API call. In one embodiment, there may be two types of locks available to an application: an "exclusive lock" and a "shared lock." An exclusive lock may give the application exclusive access to the BLOB until the application calls an unlock properties API. No other applications may be able to read or make modifications to the BLOB while a particular application has locked the given BLOB. On the other hand, a shared lock may allow multiple applications to lock a given BLOB at the same time. Thus, application A may be able to request a shared lock on a BLOB even though the BLOB has already been locked by application B. In one embodiment, a shared lock may allow any subsequent lockers to read the BLOB but may not allow the subsequent lockers to make edits. Thus, in the example above, application A may be able to read the properties of the BLOB but may not be able to make changes to the BLOB.

In another example, no applications may be able to make modifications to the BLOB while the BLOB is under a shared lock. In yet another example, two or more applications may agree on a set of rules regarding read and write operations to a BLOB under the shared lock. If an application attempts to acquire a lock on multiple BLOBs at once, and one of the BLOBs is already under an exclusive lock, the entire lock operation may fail for all of the BLOBs. Alternatively, the application may be granted a lock on only the BLOBs that are not under an exclusive lock. The storage virtualization filter 204 may be aware of the specific application that has locked a particular BLOB since the storage virtualization filter 204 is the component in charge of the store and retrieve operations.

As discussed herein, an application 130 may communicate with the shell 210 to request that individual property values be set on a file or be added or updated in a given BLOB. The application may identify the BLOB by the BLOB identifier, such as the 32 bit integer (e.g., GUID). The shell may then call a storage virtualization filter API, such as the store properties API, to store the BLOB in the secondary data stream. The storage virtualization filter 204 may then store the BLOB in the secondary data stream. In another example, the application may wish to retrieve an individual property of a given BLOB. The application may communicate with the shell to call a storage virtualization filter API, such as the retrieve properties API, causing the storage virtualization filter to find that BLOB in the secondary data stream and pass the contents of the BLOB to the shell. The shell may then retrieve the requested property and return it to the application.

In one embodiment, an application may want to modify a property value stored in an existing BLOB. The shell may determine that the particular value in the BLOB needs to be updated but that there are other properties in the BLOB that must be left alone. In order to address this, the shell may acquire an exclusive lock on the BLOB being changed. The shell may then call a retrieve properties API to read the properties of the BLOB into the shell's memory. The shell may then decode the BLOB so that it knows all of the individual values of the BLOB. The shell may change the property requested by the application to be modified, but may leave all other property values stored in the BLOB unchanged. The shell may then re-encode this set of values into a new BLOB and may call the store properties API to store the new BLOB in the secondary storage. However, the shell will use the same identifier for the new BLOB as the original BLOB. The storage virtualization filter 204 may then overwrite the old BLOB, and the shell 210 may call the unlock properties API to unlock the BLOB.

The shell 210 may be configured to sort the one or more BLOBs based on the type of BLOB. In one embodiment, there may be two types of BLOBs in the secondary storage: a storage virtualization provider supplemental properties BLOB and a file format properties BLOB. The storage virtualization provider supplemental properties BLOB may comprise properties that are generated by or provided by a storage virtualization provider 204—and for which the storage virtualization provider may make a request to the shell to store in associate with a file that the storage virtualization provider is managing on remote storage. These properties may be properties that describe the file in the context of the storage virtualization provider, such as whether the file is checked out, who last modified the file, and whether the file is shared between two or more users. In contrast, the file format properties BLOB may contain information that is derivable from the contents of the file itself. In an example that the file is a music file, the file format properties BLOB may store metadata about the artist, number of tracks, the length of each track, and the like. When the file later fully hydrated, the file format properties BLOB may no longer be needed since the contents of the file may be present on the computing device. Thus, when the file is fully hydrated, the file format properties BLOB may be deleted since it would make more sense to use the most up to date information. However, any storage virtualization provider supplemental properties BLOB may remain intact. It is understood that other types of BLOBs may be included as well. In one embodiment, a third category of BLOB may allow an application to add metadata that describes a file. For example, if the application is a photograph application that can perform face recognition, the application may be able to store the names associated with the detected faces as metadata in the BLOB.

The BLOB may be formatted in any number of ways. In one embodiment, a properties store may identify certain properties of the BLOB using, for example, a globally unique identifier (GUI). However, unknown properties may also be stored. These properties may have a value that can be almost any serializable type (e.g., string, Boolean, signed/unsigned integers, etc.). The properties may be serialized into an internal format and then deserialized upon being read. As discussed herein, the BLOB may also be compressed to save room in the secondary storage.

The illustrations of the aspects described herein are intended to provide a general understanding of the structure of the various aspects. The illustrations are not intended to serve as a complete description of all of the elements and features of apparatus and systems that utilize the structures or methods described herein. Many other aspects may be apparent to those of skill in the art upon reviewing the disclosure. For example, while the methods and system discussed herein have been applied to the use of placeholders in a storage virtualization system, it is understood that the methods and systems may be used for any number of purposes. Other aspects may be utilized and derived from the disclosure, such that structural and logical substitutions and changes may be made without departing from the scope of the disclosure. Accordingly, the disclosure and the figures are to be regarded as illustrative rather than restrictive.

The various illustrative logical blocks, configurations, modules, and method steps or instructions described in connection with the aspects disclosed herein may be implemented as electronic hardware or computer software. Various illustrative components, blocks, configurations, modules, or steps have been described generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the present disclosure.

The various illustrative logical blocks, configurations, modules, and method steps or instructions described in connection with the aspects disclosed herein, or certain aspects or portions thereof, may be embodied in the form of computer executable instructions (i.e., program code) stored on a computer-readable storage medium which instructions, when executed by a machine, such as a computing device, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any non-transitory (i.e., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computer.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

The description of the aspects is provided to enable the making or use of the aspects. Various modifications to these aspects will be readily apparent, and the generic principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed:

1. A method comprising:
   storing, on storage of a computing device, a placeholder for a file, wherein data of the file is stored remotely from the storage and the placeholder comprises:
      a sparse data stream containing none or some of the data of the file; and
      information that enables the remotely stored data of the file to be retrieved;
   receiving a request to store metadata associated with the file;
   storing the metadata as a Binary Large Object (BLOB) in a secondary data stream of the placeholder, the BLOB having an associated flag;
   retrieving the remotely stored data of the file;
   storing the retrieved data in a primary data stream on the storage, thereby converting the placeholder to a regular file; and
   determining, based on the associated flag indicating whether the BLOB is deleted when the placeholder is converted to the regular file, to delete the BLOB from the secondary data stream in response to the placeholder being converted to the regular file.

2. The method of claim 1, wherein the secondary data stream comprises a plurality of BLOBs, each BLOB comprising a different type of metadata associated with the file.

3. The method of claim 2, wherein the secondary data stream comprises a header for storing information about the plurality of BLOBs.

4. The method of claim 1, wherein properties contained within the BLOB are opaque to a file system of the storage.

5. The method of claim 1, further comprising:
   receiving, from an application, a request to lock the BLOB; and
   locking, in response to the request, the BLOB, thereby providing, to the application, exclusive access to the BLOB.

6. The method of claim 1, wherein the request to store metadata is received from one of an application or a storage virtualization provider that manages the remotely stored data.

7. A computing device comprising:
a processor,
storage, and
memory storing computer-executable instructions that, when executed by the processor, implement a file system for managing the storage of files on storage of the computing device, the file system being configured to perform operations comprising:
  storing, on the storage, a placeholder for a file, wherein data of the file is stored remotely from the storage and the placeholder comprises:
    a sparse data stream containing none or some of the data of the file; and
    information that enables the remotely stored data of the file to be retrieved from the network;
  receiving a request to store metadata associated with the file;
  storing the metadata as a Binary Large Object (BLOB) in a secondary data stream of the placeholder, the BLOB having an associated identifier comprising a flag indicating whether the BLOB is permitted to be retained when the placeholder is converted to a regular file;
  retrieving the remotely stored data of the file;
  storing the retrieved data in a primary data stream on the storage, thereby converting the placeholder to the regular file; and
  determining, based on the flag, to delete the BLOB from the secondary data stream.

8. The computing device of claim 7, wherein the secondary data stream comprises a plurality of BLOBs, each BLOB comprising a different type of metadata associated with the file, the secondary data stream further comprising a header storing information concerning the plurality of BLOBs.

9. The computing device of claim 7, wherein the request to store metadata is received from one of an application or a storage virtualization provider that manages the data of the file that is stored remotely on the network.

10. The computing device of claim 7, wherein the secondary data stream comprises a plurality of BLOBs, each BLOB comprising a different type of metadata associated with the file.

11. The computing device of claim 10, wherein the secondary data stream further comprises a header storing information concerning the plurality of BLOBs.

12. The computing device of claim 7, wherein properties contained within the BLOB are opaque to a file system of the storage.

13. The computing device of claim 7, wherein the operations further comprise:
  receiving, from an application, a request to lock the BLOB; and
  locking, in response to the request, the BLOB, thereby providing, to the application, exclusive access to the BLOB.

14. The computing device of claim 7, wherein the BLOB is one of a sync supplemental properties BLOB or a file format properties BLOB.

15. The method of claim 1, wherein the BLOB is one of a sync supplemental properties BLOB or a file format properties BLOB.

16. A method for managing metadata associated with a file, the method comprising:
  storing, on storage of a computing device, a placeholder for a file, wherein data of the file is stored remotely from the storage and the placeholder comprises information that enables the remotely stored data of the file to be retrieved;
  receiving a request to store metadata associated with the file;
  storing the metadata as a Binary Large Object (BLOB) in a secondary data stream of the placeholder, the BLOB having an associated flag indicating whether the BLOB is deleted when the placeholder is converted to a regular file;
  retrieving remotely stored data of the file;
  storing the retrieved data in a primary data stream on the storage, thereby converting the placeholder to the regular file; and
  determining, based on the associated flag, to delete the BLOB from the secondary data stream in response to the placeholder being converted to the regular file.

17. The method of claim 16, wherein the secondary data stream comprises a plurality of BLOBs, each BLOB comprising a different type of metadata associated with the file.

18. The method of claim 17, wherein the secondary data stream further comprises a header for storing information about the plurality of BLOBs.

19. The method of claim 16, wherein a property contained within the BLOB are opaque to a file system of the storage.

20. The method of claim 16, wherein the request to store metadata is received from one of an application or a storage virtualization provider that manages the remotely stored data.

* * * * *